United States Patent
Seyama et al.

(10) Patent No.: US 10,158,446 B2
(45) Date of Patent: Dec. 18, 2018

(54) TRANSMITTING AND RECEIVING DEVICES IN CELLULAR SYSTEM

(75) Inventors: Takashi Seyama, Kawasaki (JP); Takashi Dateki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 319 days.

(21) Appl. No.: 12/484,571

(22) Filed: Jun. 15, 2009

(65) Prior Publication Data

US 2009/0262712 A1   Oct. 22, 2009

Related U.S. Application Data

(63) Continuation of application No. PCT/JP2006/326223, filed on Dec. 28, 2006.

(51) Int. Cl.
*H04J 13/00* (2011.01)
*H04J 11/00* (2006.01)
(Continued)

(52) U.S. Cl.
CPC ....... *H04J 11/0086* (2013.01); *H04J 11/0069* (2013.01); *H04J 13/0048* (2013.01);
(Continued)

(58) Field of Classification Search
CPC ........... H04B 1/713; H04B 7/068; H04L 1/04; H04L 1/0606; H04J 11/0069; H04J 11/0059; H04J 11/0062; H04J 13/0074
(Continued)

(56) References Cited

U.S. PATENT DOCUMENTS 6,377,618 B1 * 4/2002 Prasad et al. ................. 375/225
6,980,539 B2   12/2005 Hanada et al.
(Continued)

FOREIGN PATENT DOCUMENTS

JP    10-126331      5/1998
JP    2002-204217    7/2002
(Continued)

OTHER PUBLICATIONS

Korean Intellectual Property Office Notice of Preliminary Rejection issued for corresponding Korean Patent Application No. 10-2009-7013513, dated Jan. 18, 2011. English translation attached.
(Continued)

*Primary Examiner* — Andrew W Chriss
*Assistant Examiner* — Kenan Cehic
(74) *Attorney, Agent, or Firm* — Myers Wolin, LLC

(57) ABSTRACT

In a multi-carrier cellular system, a second synchronization code (a Walsh code or a GCL series code) mapped on a second synchronization channel is used as a signal for specifying in which cell of the base station a mobile station terminal device itself is. A signal transmitted from the base station to the mobile station terminal device is mapped in a radio frame having two-dimensional extension in frequency and time directions. When mapping a certain series number of the second code for specifying a cell or a cell group on the radio frame as the second synchronization channel, phase rotation or circular shift in which one radio frame is one cycle is applied to the second synchronization code. On the receiving side, the head timing of the radio frame is known by knowing the phase rotation angle or the amount of circular shift of the second synchronization code.

7 Claims, 13 Drawing Sheets

(51) Int. Cl.
  *H04L 5/00* (2006.01)
  *H04L 27/26* (2006.01)
(52) U.S. Cl.
  CPC ........ *H04J 13/0066* (2013.01); *H04L 5/0007* (2013.01); *H04L 5/0053* (2013.01); *H04L 27/2613* (2013.01); *H04L 27/2655* (2013.01); *H04L 27/2656* (2013.01); *H04L 27/2675* (2013.01); *H04L 5/0048* (2013.01)
(58) Field of Classification Search
  USPC .................................................. 370/310–350
  See application file for complete search history.

(56) References Cited

U.S. PATENT DOCUMENTS

| | | | |
|---|---|---|---|
| 7,130,293 | B2 | 10/2006 | Hanada et al. |
| 2002/0054585 | A1 | 5/2002 | Hanada et al. |
| 2002/0055357 | A1 | 5/2002 | Hanada et al. |
| 2003/0076245 | A1* | 4/2003 | Gibson ................ H04L 1/0006 341/50 |
| 2003/0152178 | A1 | 8/2003 | Tanno et al. |
| 2006/0039451 | A1 | 2/2006 | Zhuang et al. |
| 2006/0133458 | A1* | 6/2006 | Ueno ............................ 375/148 |
| 2006/0239233 | A1 | 10/2006 | Hanada et al. |
| 2008/0107086 | A1* | 5/2008 | Fukuta et al. ................ 370/335 |
| 2008/0107211 | A1* | 5/2008 | Min et al. ...................... 375/326 |
| 2010/0246525 | A1* | 9/2010 | Parts et al. .................... 370/329 |
| 2012/0113921 | A1* | 5/2012 | Muharemovic ... H04W 72/1231 370/329 |
| 2013/0070724 | A1* | 3/2013 | Malladi ................ H04L 5/0007 370/330 |

FOREIGN PATENT DOCUMENTS

| | | |
|---|---|---|
| JP | 2003-152681 | 5/2003 |
| JP | 2003-244763 | 8/2003 |
| JP | 2006-074244 | 3/2006 |
| JP | 2006-074493 | 3/2006 |
| WO | 2006/122142 | 11/2006 |

OTHER PUBLICATIONS

International Search Report with written opinion for corresponding International Application No. PCT/JP2006/326223; dated Apr. 2, 2007.
NTT DoCoMo, NEC; "SCH Structure and Cell Search Method for E-UTRA Downlink"; Agenda Item: 10.1.3; #R1-060780 (original R1-060042); 3GPP TSG-RAN WG1 Meeting #44bis; Athens, Greece; Mar. 27-31, 2006. [Ref.: International Search Report dated Apr. 2, 2007].
ETRI; "Comparison of One-SCH and Two-SCH schemes for EUTRA Cell Search"; Agenda Item: 11.1.3 Cell Search; R1-061117; 3GPP TSG RAN WG1 Meeting #45; Shanghai, China, May 8-12, 2006. [Ref.: International Search Report dated Apr. 2, 2007].
Yukiko Hanada et al.; "2-Step Fast Cell Search Method and Its Performance for Broadband Multi-carrier CDMA Wireless Access"; The Institute of Electronics, Information & Communication Engineers; vol. 100, No. 194, Wireless Research Laboratories, NTT DoCoMo, Inc.; Jul. 11, 2000. [Ref.: International Search Report dated Apr. 2, 2007].
Japanese Patent Office "Notice of Rejection Grounds" issued for corresponding Japanese Patent Application No. 2008-551995, dated Oct. 4, 2011. Partial English translation attached.
Japanese Patent Office "Notice of Rejection Grounds" issued for corresponding Japanese Patent Application No. 2008-551915, dated Oct. 4, 2011. Partial English translation attached.
Office Action issued for corresponding Canadian Patent Application No. 2,673,604, dated Apr. 29, 2013.
Russian Office Action issued for corresponding Russian Patent Application No. 2011149221, dated Aug. 23, 2013, with full English translation.
Fourth Notification of Office Action issued for corresponding Chinese Patent Application No. 200680056791.3, dated Jun. 20, 2013, with English translation.
3rd OA, Canadian Office Action dated Feb. 26, 2014 issued by the Canadian Intellectual Property Office for corresponding Canadian Patent Application No. 2673604.
ETRI; "Comparison of One-SCH and Two-SCH schemes for EUTRA Cell Search" Agenda Item 11.1.3 Cell Search; Document for: Discussion and Decision; R1-061117; 3GPP TSG RAN WG1 Meeting #45, Shanghai, China, May 8-12, 2006.
Office Action issued for corresponding Indian Patent Application No. 2288/KOLNP/2009, dated May 29, 2014.
ETRI, "Comparison of One-SCH and Two-SCH schemes for EUTRA Cell Search", Agenda Item: 11.1.3, May 8-12, 2006, R1-061117, 3GPP TSG RAN WG1 Meeting #45, Shanghai, China.
Texas Instruments, "Comparison of different S-SCH structures for E-UTRA cell search", Agenda Item: 6.3.2, Nov. 6-10, 2006, R1-063234, 3GPP TSG RAN WG1 47, Riga, Latvia.
Sharma et al., "Fast Cell Synchronization for Beyond 3G OFDMA based System", 2006, IEEE, Samsung, Bangalore, India.
Extended European search report, supplementary European search report and the European search opinion issued for corresponding European Patent Application No. 06843601.3, dated Jan. 23, 2014.
Office Action issued for corresponding Chinese Patent Application No. 201210044508.2, dated Jun. 17, 2014, with a full English translation.
3rd Notification of Office Action issued for corresponding Chinese Patent Application No. 200680056791.3, dated Dec. 13, 2012, with English translation.
Fourth (4th) Notification of Office Action issued for corresponding Chinese Application No. 201210044508.2 dated Feb. 15, 2016 with an English translation.
Fifth Notification of Office Action issued by the State Intellectual Property Office of China for corresponding Chinese Patent Application No. 201210044508.2, dated Aug. 5, 2016, with an English translation.
Third (3rd) Notification of Office Action issued for corresponding Chinese Application No. 201210044508.2 dated Jul. 31, 2015 with an English translation.
Second Notification of Office Action issued by the State Intellectual Property Office of China for corresponding Chinese Patent Application No. 201210044508.2, dated Feb. 28, 2015, with an English translation.
NTT DoCoMo et al., "SCH Sequence Configuration for E-UTRA Downlink", Agenda Item: 6.4.4, 3GPP TSG RAN WG1 Meeting #46bis, R1-062720, Seoul, Korea, Oct. 9-13, 2006.
LG Electronics, "Performance Comparison of Hierarchical and Non-hierarchical SCH Structures", Agenda Item: 4.2, 3GPP TSG RAN WG1 LTE Ad Hoc, R1-061752, Cannes, France, Jun. 27-30, 2006.

* cited by examiner

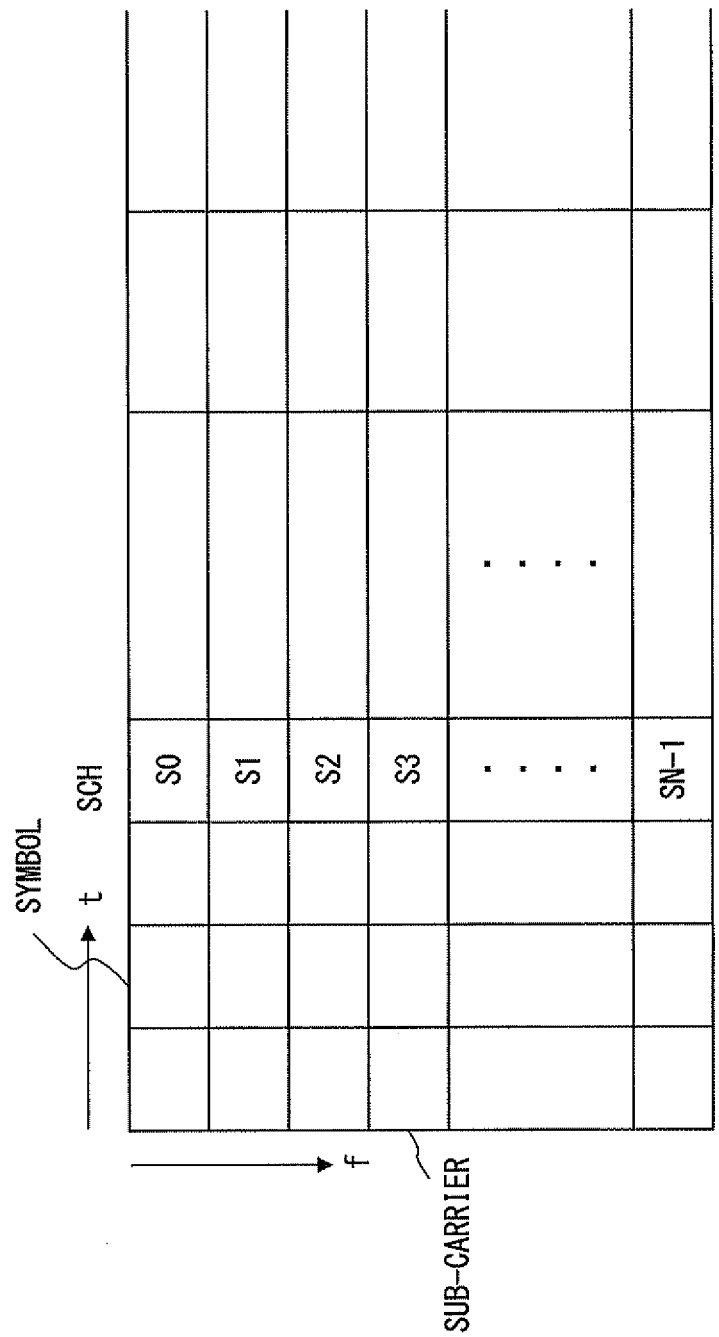

236 hopping code patterns

| 0 ~ 63 | 64 ~ 127 | 128 ~ 195 | 196 ~ 235 |
|---|---|---|---|
| 4, 5, 6, 7, 8 | 28, 1, 15, 29, 2 | 16, 32, 9, 30, 32 | 8, 6, 33, 30, 33 |
| 9, 10, 11, 12, 13 | 16, 30, 3, 17, 31 | 16, 0, 36, 18, 20 | 14, 4, 28, 34, 17 |
| 14, 15, 16, 17, 18 | 4, 18, 32, 5, 19 | 34, 9, 18, 35, 9 | 11, 30, 38, 4, 1 |
| 19, 20, 21, 22, 23 | 21, 35, 8, 22, 36 | 31, 19, 6, 38, 24 | 5, 21, 2, 39, 26 |
| 24, 25, 26, 27, 28 | 9, 23, 37, 10, 24 | 23, 2, 21, 9, 13 | 33, 19, 36, 26, 10 |
| 29, 30, 31, 32, 33 | 38, 11, 25, 39, 12 | 0, 1, 29, 14, 28 | 9, 2, 34, 25, 34 |
| 34, 35, 36, 37, 38 | 33, 7, 22, 37, 11 | 36, 19, 0, 3, 27 | 18, 10, 9, 29, 28 |
| 0, 2, 4, 6, 39 | 26, 0, 15, 30, 4 | 13, 36, 27, 20, 6 | 8, 24, 2, 25, 22 |
| 35, 38, 0, 29, 32 | 19, 34, 8, 23, 38 | 3, 26, 17, 14, 26 | 22, 20, 31, 29, 16 |
| 33, 36, 39, 1, 4 | 12, 27, 1, 16, 31 | 24, 19, 31, 5, 25 | 18, 3, 13, 7, 10 |
| 5, 9, 13, 38, 1 | 5, 20, 35, 9, 24 | 23, 17, 4, 1, 4 | 16, 28, 23, 22, 4 |
| 6, 12, 29, 35, 0 | 39, 13, 28, 2, 17 | 12, 35, 18, 1, 24 | 23, 32, 28, 6, 39 |
| 36, 1, 18, 24, 30 | 32, 6, 21, 36, 10 | 35, 31, 11, 3, 34 | 11, 29, 19, 24, 39 |
| 7, 13, 19, 25, 31 | 14, 35, 15, 36, 16 | 23, 35, 5, 38, 18 | 17, 1, 2, 22, 38 |
| 2, 8, 14, 20, 37 | 3, 27, 34, 23, 8 | 24, 0, 12, 36, 2 | 33, 2, 0, 20, 37 |
| 26, 32, 38, 3, 9 | 35, 17, 16, 6, 25 | 26, 13, 29, 5, 27 | 38, 9, 3, 0, 36 |
| 21, 27, 33, 39, 15 | 3, 32, 25, 33, 5 | 5, 0, 28, 15, 11 | 26, 12, 10, 7, 35 |
| 16, 22, 28, 4, 10 | 24, 20, 27, 0, 13 | 19, 10, 6, 0, 36 | 12, 0, 31, 28, 34 |
| 32, 3, 37, 8, 20 | 31, 0, 16, 27, 5 | 26, 36, 9, 34, 20 | 35, 21, 3, 19, 33 |
| 38, 31, 2, 14, 26 | 23, 0, 22, 2, 3 | 27, 35, 12, 26, 7 | 31, 25, 17, 15, 18 |
| 20, 34, 7, 33, 6 | 36, 33, 16, 25, 2 | 5, 7, 3, 2, 1 | 4, 15, 26, 1, 15 |
| 9, 11, 13, 15, 17 | 25, 11, 37, 26, 10 | 6, 18, 7, 36, 36 | 28, 27, 38, 30, 34 |
| 19, 21, 23, 25, 27 | 11, 26, 24, 6, 17 | 31, 15, 25, 8, 30 | 28, 22, 5, 15, 12 |
| 29, 31, 33, 35, 37 | 28, 18, 2, 37, 21 | 11, 38, 14, 30, 24 | 34, 10, 19, 18, 9 |
| 8, 10, 12, 14, 16 | 0, 33, 37, 13, 30 | 7, 38, 24, 10, 18 | 18, 37, 20, 15, 28 |
| 18, 20, 22, 24, 26 | 22, 32, 13, 0, 38 | 39, 27, 17, 32, 12 | 6, 32, 24, 1, 16 |
| 28, 30, 32, 34, 36 | 34, 11, 21, 5, 14 | 22, 3, 34, 30, 14 | 7, 35, 30, 2, 4 |
| 14, 17, 20, 23, 26 | 12, 4, 14, 23, 33 | 4, 34, 3, 35, 13 | 13, 35, 39, 25, 21 |
| 3, 6, 9, 12, 15 | 29, 11, 4, 17, 5 | 21, 19, 13, 37, 12 | 27, 11, 36, 30, 9 |
| 18, 21, 24, 27, 30 | 9, 1, 39, 28, 7 | 13, 10, 31, 23, 11 | 29, 20, 6, 34, 38 |
| 7, 10, 13, 16, 19 | 18, 15, 2, 23, 31 | 22, 0, 9, 25, 10 | 35, 10, 5, 32, 33 |
| 22, 25, 28, 31, 34 | 8, 28, 0, 39, 11 | 34, 28, 39, 31, 9 | 30, 35, 25, 21, 26 |
| 19, 23, 27, 31, 35 | 5, 22, 8, 33, 15 | 14, 37, 19, 5, 8 | 39, 8, 30, 23, 19 |
| 39, 2, 6, 10, 14 | 19, 37, 28, 29, 6 | 3, 7, 4, 39, 1 | 31, 6, 2, 33, 12 |
| 18, 22, 26, 30, 34 | 1, 26, 20, 11, 14 | 21, 14, 5, 24, 39 | 35, 20, 33, 11, 5 |
| 17, 21, 25, 29, 33 | 6, 5, 39, 38, 27 | 28, 16, 33, 27, 17 | 21, 6, 22, 1, 39 |
| 37, 0, 4, 8, 12 | 37, 39, 35, 13, 17 | 28, 20, 19, 32, 36 | 13, 32, 30, 14, 32 |
| 16, 20, 24, 28, 32 | 1, 24, 3, 29, 15 | 24, 4, 35, 28, 33 | 11, 17, 2, 19, 14 |
| 24, 29, 34, 39, 3 | 10, 30, 25, 5, 28 | 34, 32, 27, 13, 15 | 19, 30, 16, 35, 3 |
| 8, 13, 18, 23, 28 | 7, 29, 16, 15, 22 | 34, 15, 0, 21, 3 | 6, 8, 26, 22, 35 |
| 33, 38, 2, 7, 12 | 37, 23, 11, 2, 29 | 16, 4, 31, 21, 32 | |
| 17, 22, 27, 32, 37 | 19, 14, 12, 39, 30 | 9, 27, 18, 19, 8 | |
| 1, 6, 11, 16, 21 | 34, 33, 20, 1, 23 | 1, 28, 19, 3, 37 | |
| 26, 31, 36, 0, 5 | 21, 8, 7, 6, 27 | 3, 28, 21, 37, 25 | |
| 10, 15, 20, 25, 30 | 17, 26, 3, 8, 32 | 16, 2, 32, 11, 22 | |
| 34, 0, 7, 14, 21 | 17, 35, 22, 12, 7 | 10, 20, 3, 1, 15 | |
| 28, 35, 1, 8, 15 | 15, 35, 14, 27, 25 | 1, 7, 30, 8, 8 | |
| 22, 29, 36, 2, 9 | 31, 37, 9, 6, 1 | 22, 14, 25, 12, 1 | |
| 16, 23, 30, 37, 3 | 26, 4, 23, 1, 32 | 23, 7, 26, 25, 35 | |
| 10, 17, 24, 31, 38 | 32, 12, 18, 29, 21 | 30, 9, 0, 17, 28 | |
| 4, 11, 18, 25, 32 | 30, 17, 38, 15, 37 | 18, 36, 6, 31, 21 | |
| 39, 5, 12, 19, 26 | 33, 22, 6, 24, 13 | 25, 22, 38, 23, 15 | |
| 39, 6, 14, 22, 30 | 4, 38, 33, 8, 34 | 10, 2, 5, 30, 34 | |
| 38, 5, 13, 21, 29 | 27, 37, 33, 32, 10 | 20, 17, 8, 38, 16 | |
| 37, 4, 12, 20, 28 | 13, 2, 11, 35, 34 | 23, 21, 30, 28, 25 | |
| 36, 3, 11, 19, 27 | 15, 14, 11, 7, 37 | 23, 12, 34, 37, 27 | |
| 35, 2, 10, 18, 26 | 29, 1, 27, 2, 38 | 23, 14, 0, 18, 16 | |
| 34, 1, 9, 17, 25 | 38, 16, 39, 29, 9 | 3, 30, 6, 36, 22 | |
| 33, 0, 8, 16, 24 | 9, 36, 24, 17, 28 | 29, 4, 7, 15, 16 | |
| 18, 30, 1, 13, 25 | 4, 0, 25, 9, 39 | 9, 4, 27, 29, 37 | |
| 15, 27, 39, 10, 22 | 8, 21, 11, 1, 20 | 8, 39, 26, 29, 24 | |
| 34, 5, 17, 29, 0 | 4, 36, 14, 13, 31 | 14, 18, 6, 29, 2 | |
| 12, 24, 36, 7, 19 | 39, 7, 25, 36, 32 | 23, 6, 16, 5, 37 | |
| 9, 21, 33, 4, 16 | 34, 2, 13, 8, 36 | 3, 38, 13, 26, 13 | |

F I G. 2

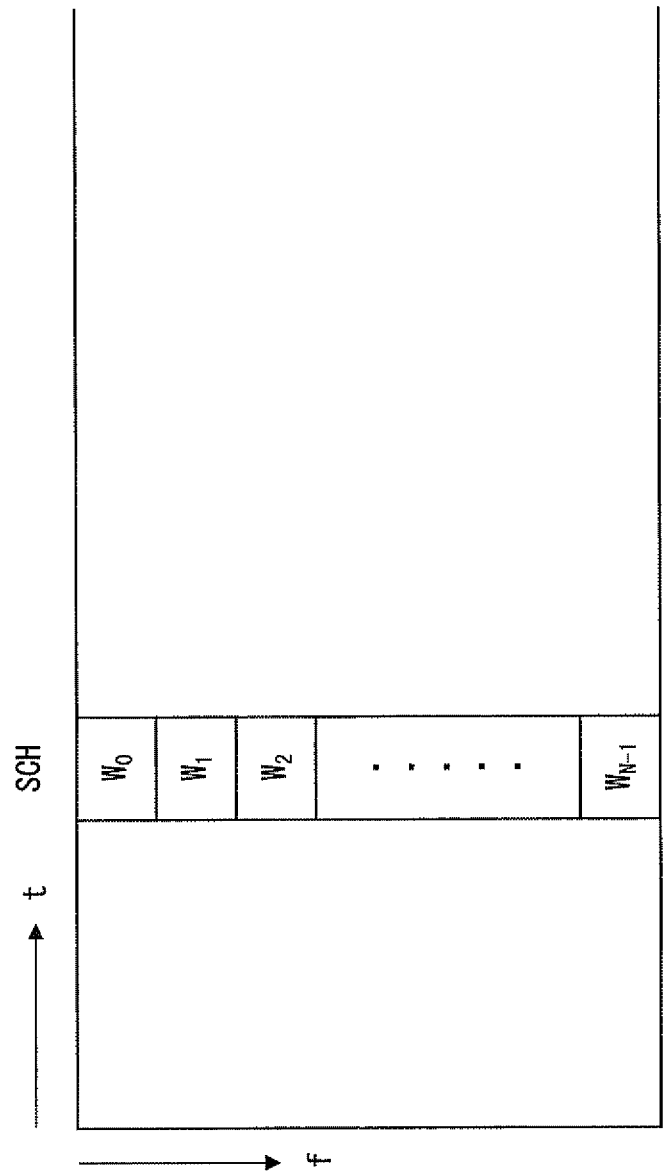

TRANSMITTING AND RECEIVING DEVICES IN CELLULAR SYSTEM

CROSS-REFERENCE TO RELATED APPLICATION

This application is a continuation application of International PCT Application No. PCT/JP2006/326223 which was filed on Dec. 28, 2006.

FIELD

The embodiments discussed herein are related to transmitting and receiving devices in a cellular system.

BACKGROUND

In a cellular system, generally a mobile station terminal device searches for a cell to connect a wireless link. The cell is searched for using a synchronization channel (SCH) included in the radio frame of a downlink. Sometimes, in addition to the synchronization channel, a particular cell specific pilot channel or a broadcast channel (BCH) is used (see Non-patent document 1).

The first prior art described in Non-patent document 2 is explained with reference to FIGS. 1A, 1B and 2.

In this prior art, a plurality of SCH symbols is transmitted in a radio frame. On each SCH symbol, a generalized chip like series code (a GCL series code) is multiplexed in a frequency direction.

FIGS. 1A and 1B illustrate the multiplexing of SCH.

In FIG. 1A, frequency and time directions are taken on vertical and horizontal axes, respectively, and a radio resource is expressed. Furthermore, FIG. 1A illustrates how SCH is transmitted using the radio resource. SCH is located in a prescribed position in the time direction. $S_0$, $S_1$, $S_2$, $S_3$, ... and $S_{N-1}$ indicate each symbol of the GCL series code. Each symbol of the GCL series code is transmitted at the transmission timing of SCH, using one sub-carrier. When the number of sub-carriers is N, the GCL series code becomes a code of length N, composed of symbols $S_0$ through $S_{N-1}$.

The series number of the GCL series code multiplexed on each SCH symbol changes in the time direction. The pattern of change is a pattern having good cross-correlation and auto-correlation characteristic (called hopping code pattern in Non-patent document 2) and indicates an identifier for identifying a cell (or a cell group) and radio frame timing. Specifically, if the time change pattern of the series number of an SCH symbol transmitted from the cell of an identifier g for identifying a cell or cell group is as follows ($N_{sync}$: number of SCH symbols in a radio frame),

[Mathematical Expression 1]

$$h^{(g)} = (h_0^{(g)}, h_1^{(g)}, h_2^{(g)}, \ldots, h_{N_{sync}-1}^{(g)})$$

the GCL series code multiplexed on the i-th SCH symbol in a radio frame can be expressed as follows.

[Mathematical expression 2]

$$s_{h_i^{(g)}}(k) = \exp\left(-j2\pi h_i^{(g)} \frac{k(k+1)}{2N_G}\right) \quad (1)$$

In the above expression, $N_G$ and k are the series length of a GCL series code and the number of a symbol, respectively. In the case k=0, it indicates the first (0-th) symbol of this GCL series code. Similarly, k=1, ... and k=n indicate the first symbol, ... and the n-th symbol, respectively.

FIG. 1B illustrates the case where four SCHs are time-multiplexed on one radio frame taking a frequency and time on the vertical and horizontal axes. In FIG. 1B, the GCL series code of an identifier g is multiplexed as an SCH. $h^{(g)}_i$ is a hopping code pattern (an index number) used when generating the GCL series code of the identifier g. In FIG. 1B, four GCL series codes which have the same identifier specified by the same cell or cell group and the series number of the hopping code pattern of which are different are time-multiplexed.

FIG. 2 illustrated an example of a hopping code pattern.

It is the identifier g that indicates in what ordered row of this table the hopping code pattern is. For example, when the identifier g is 0, {4, 5, 6, 7 and 8} are listed as a hopping code pattern. In this case, the series length of the hopping code pattern is 5. Therefore, in the above example, as each series number, $h^{(0)}_0=4$, $h^{(0)}_1=5$, $h^{(0)}_2=6$, $h^{(0)}_3=7$ and $h^{(0)}_4=8$. Therefore, the hopping code pattern illustrated in FIG. 2 can be used when five SCHs are time-multiplexed on one radio frame.

On the receiving side, FFT is applied to the SCH symbols on the basis of the result of symbol and sub-frame timing detection performed before the detection process of the identifier of a cell (or a cell group) to transform the SCH symbols into a frequency domain. A sub-carrier component on which a GCL series code is multiplexed is extracted from the signal in the frequency domain and IDFT is applied to its differentially demodulated series code. The differential demodulation means to calculate $S(n) \times S^*(n+1) = \exp\{j2\pi h^{(g)}_i(n+1)/N_G\}$ assuming the symbol of the n-th code as S(n). Thus, a value obtained by the differential demodulation becomes one obtained by rotating $2\pi h^{(g)}_i/N_G$ integer times. Therefore, knowing how many times it is rotated, $h^{(g)}_i$ can be known assuming that $N_G$ is already known. In reality, this is applied to all the SCH symbols in the radio frame and its IDFT output is stored in memory. Then in order to determine a hopping code pattern by applying soft-decision to it, the metric of all the circular shift patterns of a candidate hopping code pattern is calculated and the hopping code pattern of circular shift that obtains a maximum value is specified as the detection value of the identifier and radio frame timing of a cell (or a cell group). The metric calculation means to add the IDFT output values of $S(n) \times S^*(n+1)$ obtained by the differential demodulation of all the hopping code patterns and all the circular patterns and to determine the largest added value to be a hopping code pattern to be obtained. For example, in the above example, IDFT output values obtained from the 0-th through fourth radio frames are stored as the function of n. Then, as to the IDFT output value obtained from the 0-th SCH, a value obtained when n=4 is taken. Similarly, as to those of the first, second, third and fourth SCHs, values obtained when n=5, n=6, n=7 and n=8, respectively, are taken and the value are added and stored. Then, a hopping code pattern given to n is circularly shifted and similarly a new added value are obtained and stored. Then, the same calculation is also applied to the hopping code patterns of other identifiers and their added values are stored. Then, after all the added values of the hopping code patterns of all the identifiers are obtained, the maximum value of them is searched for and the identifier and amount of circular shift of the hopping code pattern that gives this maximum value are obtained.

Another prior art is described in Non-patent document 3. The second prior art of Non-patent document 3 is explained with reference to FIGS. 3A and 3B.

In this prior art, a plurality of SCH symbols is transmitted in a radio frame. An orthogonal code for indicating a cell group identifier and radio frame timing (for example, a Walsh code) is multiplexed in the frequency direction. Different from the earlier-described prior art, a series number change pattern in the time direction does not indicate the cell group identifier and radio frame timing, but the series number itself indicates the cell group identifier and radio frame timing (and other information).

In order to increase the number of codes of a secondary SCH (the second synchronization channel), a method for multiplexing the plurality of orthogonal codes in the frequency direction is disclosed. FIG. 3A illustrates that a Walsh code is multiplexed in the frequency direction of an SCH. In this case, each symbol $W_i$ (i=0 through N−1) is assigned to each sub-carrier and the code length is N. According to the nature of a Walsh code, there are only N types of Walsh codes of length N. therefore, As illustrated in FIG. 3B, the identifier multiplexes Walsh codes g and f of length M in the frequency direction. In this case, it is assumed that 2M=N. Then, the number of codes that can be used for an SCH the number of whose sub-carriers is N becomes M×M since a Walsh code of length M and a Walsh code of length M are combined. For example, if M=4 and N=8, in the case of FIG. 3A, the number of usable Walsh codes is 8 (N=8), while in the case of 3B, it becomes 16 (M×M=16) and it increases.

On the receiving side, the FFT of SCH symbols are performed on the result of symbol and sub-frame timing detection performed before the detection process of the identifier of a cell group, the correlation process of SCHs is performed in the frequency domain and cell group identifier and radio framing timing is detected.

Patent document 1 discloses a technology for shifting the transmitting phase of each down frame transmitting for each TCH and transmitting it in order to improve the accuracy of channel estimation.

Non-patent document 1: 3GPP TR25.814 V7.0.0
Non-patent document 2: 3GPP TSG-RAN WG1, R1-061117, "Comparison of One-SCH and Two-SCH schemes for EUTRA CELL Search", ETRI
Non-patent document 3: 3GPP TSC-RAN WG1, R1-060780, "SCH Structure and Cell Search Method foe E-UTRA Downlink", NTT DoCoMo, NEC
Patent document 1: Japanese Patent Laid-open Publication No. H10-126331

In the above prior arts, since the series number of a series code multiplexed on each SCH in a radio frame differs, it is necessary to perform IDFT, etc. and a correlation process, using codes of all the series numbers for each receiving SCH at the time of SCH detection on the receiving side and thereby the amount of process increases.

SUMMARY

The transmitting device of the present invention puts a signal in a radio frame where a plurality of synchronization channels is multiplexed in the time direction and transmits the signal and includes a transmitting unit for mapping a code whose size is according to its position in the radio frame in which a synchronization channel on which a code is mapped is multiplexed and to which modulation using one radio frame as one cycle is applied on the synchronization channel and transmitting the code.

The receiving device of the present invention receives a signal put in a radio frame in which the code whose size is according to its position in the radio frame in which synchronization channels for mapping a code are multiplexed and to which modulation using one radio frame as one cycle is applied is mapped. The receiving device includes a code specification unit for specifying a code mapped on the synchronization channel and a radio frame timing acquisition unit for obtaining the head timing of a radio frame from the position in the radio frame in which synchronization channels are multiplexed.

The object and advantages of the invention will be realized and attained by means of the elements and combinations particularly pointed out in the claims.

It is understood that both the foregoing general description and the following detailed description are exemplary and explanatory and are not restrictive of the invention, as claimed.

BRIEF DESCRIPTION OF DRAWINGS

FIG. 1A illustrates the multiplexing of SCHs (No. 1);
FIG. 2 illustrates an example of the hopping code pattern;
FIG. 3A explains the second example of the prior art (No. 1)

DESCRIPTION OF EMBODIMENTS

Figure 1B:
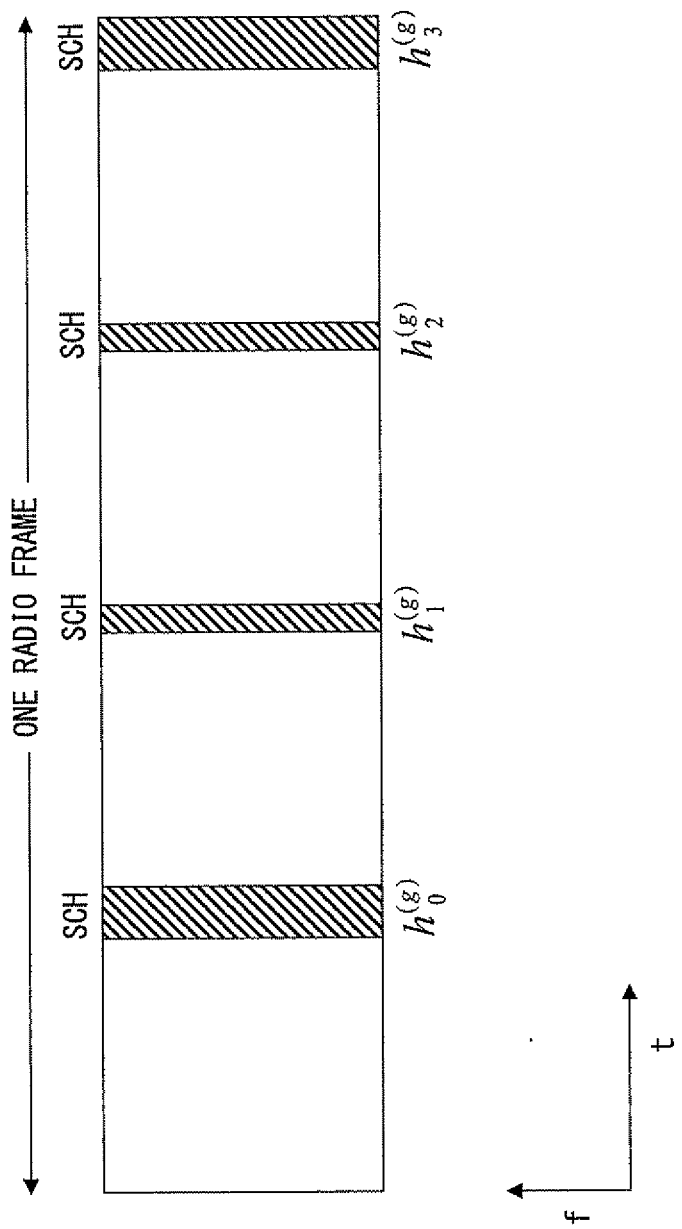
FIG. 1B illustrates the multiplexing of SCHs (No. 2)
Figure 3B:
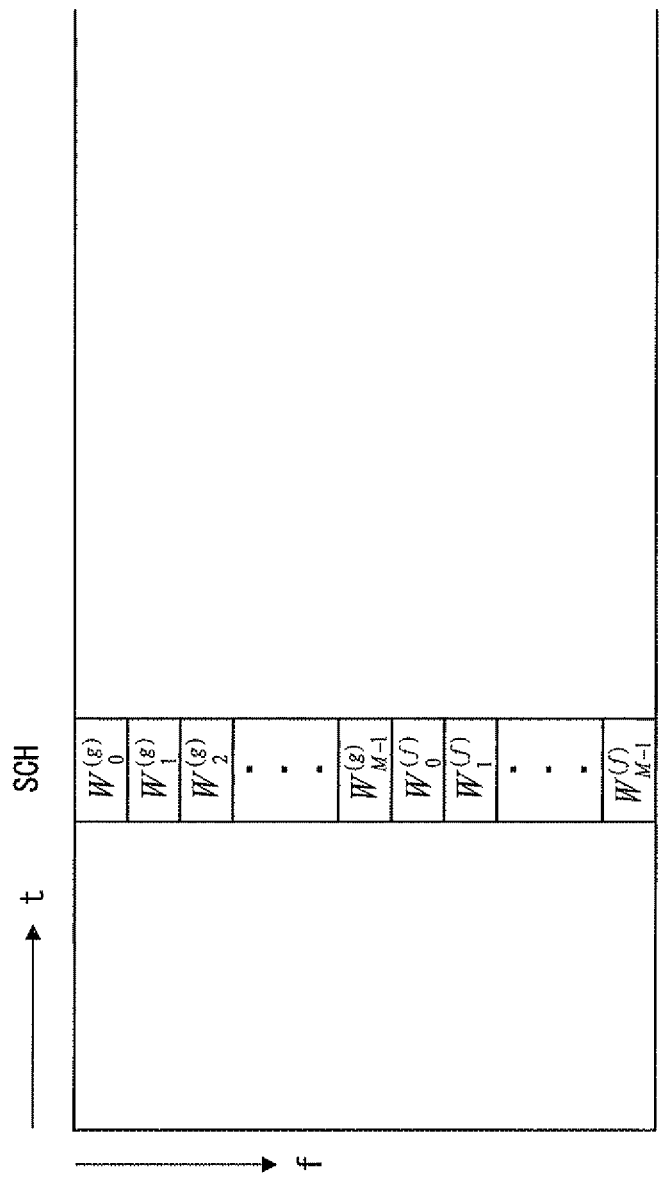
FIG. 3B explains the second example of the prior art (No. 2)

In the preferred embodiment of the present invention, firstly, as the first solution, although the series number of a Walsh code to be multiplexed on each SCH symbol in a radio frame is the same, the phase of each Walsh code is rotated by certain amount according to its position in the radio frame. The phase rotation is closed in the cycle of one radio frame.

Alternatively, as the second solution, although the series number of a GCL series code to be multiplexed on each SCH symbol in a radio frame is the same, the GCL series code is circularly shifted by certain amount according to its position in the radio frame. The circular shift is closed in the cycle of one radio frame.

Preferred embodiments of the present invention will be explained in detail below. The following preferred embodiment expresses timing synchronization using a first synchronization channel and cell group identification using a second synchronization channel and is based on three-stage cell search using a pilot channel. However, the present invention is not limited to it. For example, even in the case of another piece of timing synchronization method (a guard interval correlation method in the case of OFDM) or when the second synchronization channel indicates a cell identifier, the present invention is applicable.

The first preferred embodiment of the present invention will be explained below with reference to FIGS. 4 through 6.

The first preferred embodiment is the most basic preferred embodiment of the first solution. FIG. 4 is an example configuration of a base station device. Data signals of a data channel, the first synchronization channel, the second synchronization channel whose phase is rotated by a phase rotation processing unit 10 are multiplexed in a channel multiplex unit 11 and are converted from serial to parallel in a serial/parallel conversion processing unit 12. After the data signal is converted to a parallel signal, inverse Fourier-transform is applied to it in an IFFT processing unit to generate a signal in the time domain. Then, a guard interval is attached to the data signal in a guard interval insertion unit 14 and the data signal is transmitted via a radio process unit 15 and an antenna 16.

The pilot channel is a reference signal for data channel modulation. The first synchronization channel is a common inter-cell signal for timing synchronization. The second synchronization channel is a Walsh code indicating a cell group identifier (or a cell identifier). The Walsh code is a code used for an extended code in W-CDMA and the like and is an orthogonal code having nature that correlation between codes belonging to different identifiers is 0. The base station belonging to a cell group identifier g uses the g-th Walsh code W. The phase of the second synchronization channel is rotated according to its position in a radio frame by the channel rotation processing unit 10. More specifically, the phase of the Walsh code of the second synchronization channel multiplexed on the i-th (i=0, 1, 2, ..., $N_{sync}-1$) ($N_{sync}$ is the number of SCHs in a radio frame) SCH symbol is rotated by $\exp\{j2\pi i/N_{sync}\}$. Thus, the phase is rotated one cycle or the one cycle of the phase rotation becomes the length of one radio frame. Specifically, the length becomes as follows.

[Mathematical expression 3]

$$\exp\left(j2\pi \frac{i}{N_{sync}}\right) W_g \quad (2)$$

The channel multiplex unit 11 multiplexes respective channels. The serial/parallel conversion processing unit 12 maps a signal sequence inputted from the channel multiplex unit 11 on a sub-carrier. The IFFT processing unit 13 converts the signal in the frequency domain to a signal in the time domain and generates a valid symbol. The guard interval insertion unit 14 copies the later portion of the valid symbol and attaches it the head of the valid symbol. After a wireless process, such as up-conversion and the like, is applied to the signal in the radio process unit 15, the signal is transmitted from the antenna 16.

Figure 5:
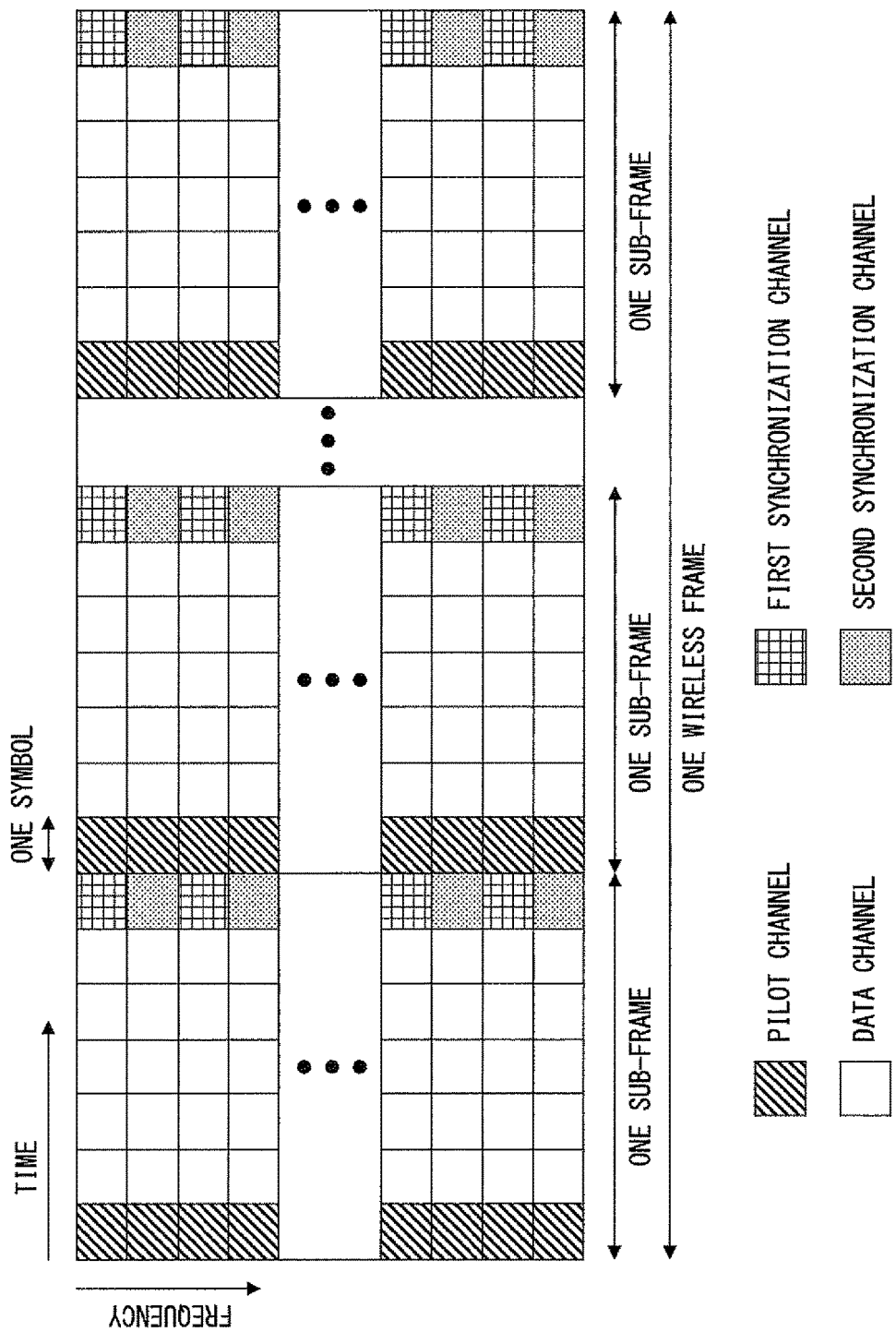
FIG. 5 explains the first preferred embodiment of the present invention (No. 2)

FIG. 5 is an example of the radio frame structure. In the example of FIG. 5, the pilot channel and the synchronization channel are disposed at the head and tail symbols, respectively, of a sub-frame. The first and second synchronization channels are alternately frequency-multiplexed. FIG. 5 is only an example of the channel multiplex method and the method is not restrictive of the present invention. As to the mapping method of the second synchronization channel, many methods can be considered. For example, mapping can be performed in an absolute phase assuming coherent detection using the first synchronization channel as the reference signal. Alternatively, mapping can also be performed by differential encoding. At any rate, the method is not restrictive of the present invention.

Figure 6:
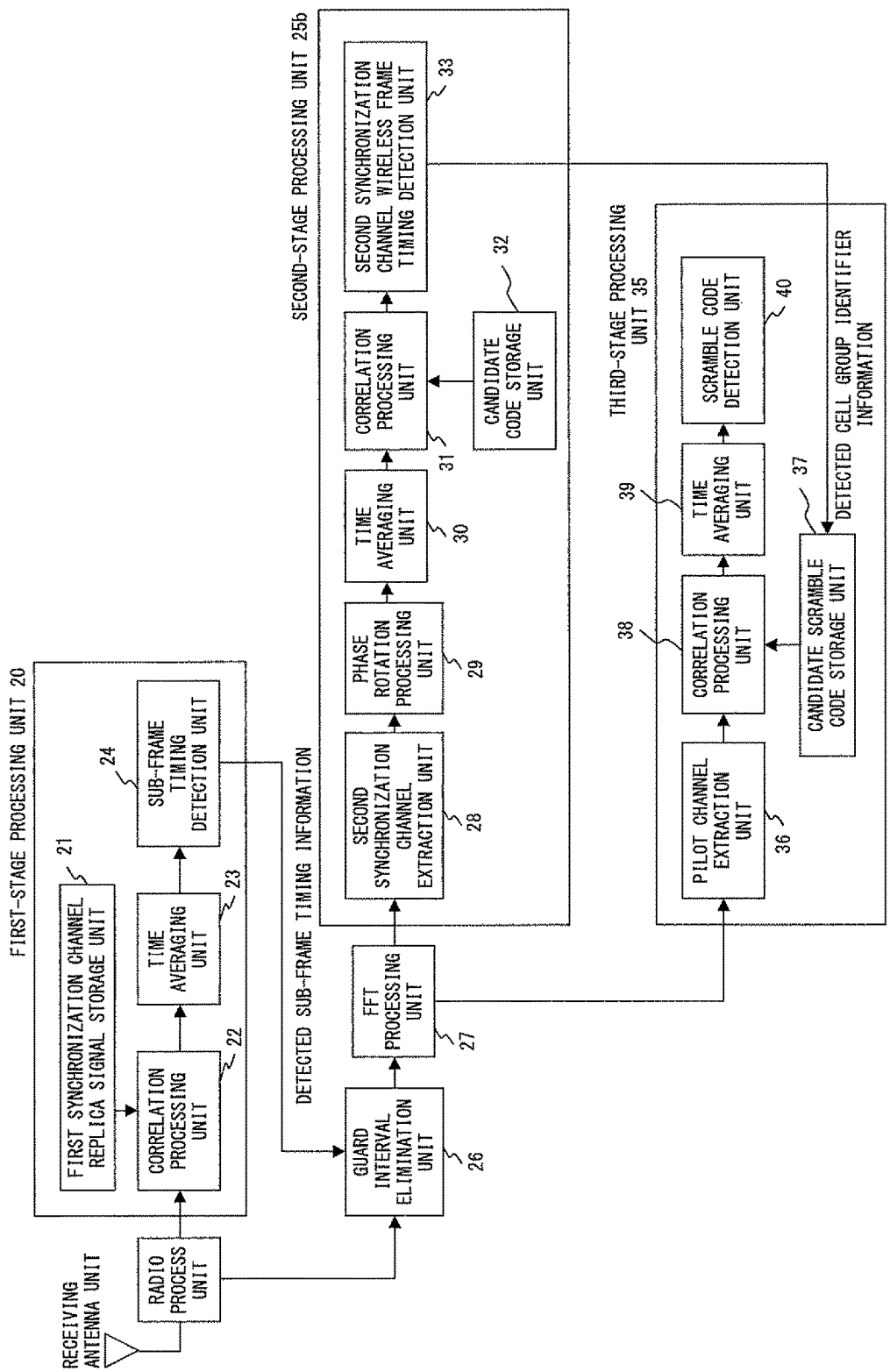
FIG. 6 explains the first preferred embodiment of the present invention (No. 3)

FIG. 6 is an example configuration of the cell search processing unit on a mobile station.

In a first-stage processing unit 20, the correlation process between the replica signal of the first synchronization channel having a known pattern stored in a first synchronization channel replica signal storage unit 21 and a received signal is performed in the time domain by a correlation processing unit 22, the result is time-averaged by a time averaging unit 23 and timing of obtaining the maximum correlation value is detected as detected sub-frame timing and detected FFT timing by a sub-frame timing detection unit 24.

In a second-stage processing unit 25, the guard interval is eliminated according to the FFT timing detected in the first-stage processing unit 20 by a guard interval elimination unit 26 and the signal is converted to a signal in the frequency domain by the FFT process of a FFT processing unit 27. Then, a second synchronization channel extraction unit 28 extracts the second synchronization channel. In this case, since radio frame timing is unknown, the phase of the extracted second synchronization channel is also unknown. However, since the amount of phase rotation pre-determined by the transmitting side is given to the Walsh code, the amount of phase rotation per SCH symbol is known. A phase rotation processing unit 29 applies phase rotation the reversal of applied on the transmitting side for each received SCH symbol and a time averaging unit 39 time-averages the result. In this case, although the amount of phase rotation given to the SCH on the transmitting side differs depending on its position in the radio frame of the SCH symbol, it is known that the unit amount of phase rotation is $2\pi/N_{sync}$ according to Expression 2. Therefore, this unit amount of reverse phase rotation is applied. Its correlation with a candidate Walsh code stored in a candidate code storage unit 32 is taken and in a second synchronization channel radio frame timing detection unit 33, the second synchronization channel and radio frame timing are detected by determining the maximum correlation value and its amount of phase rotation. Specifically, since the amount of phase rotation of the correlation value is $2\pi(i-1)/N_{sync}$, what is the order of SCH symbol in the radio frame can be known by calculating a value i indicating the order from the head of the SCH symbol in the radio frame. Since the position of the i-th SCH symbol in the radio frame is fixed, the position of the head of the radio frame is known.

In a third-stage processing unit 35, a pilot channel extraction unit 36 extracts a pilot signal from the sub-carrier in which the pilot channel is multiplexed. The correlation between the extracted pilot signal and a candidate scramble code stored in a candidate scramble code storage unit 37 is taken by a correlation processing unit 38 and it is averaged by a time averaging unit 39. Then, a scramble code detection unit 40 detects a candidate scramble code having the maximum correlation value from its time averaged value as a detected scramble code.

The second preferred embodiment of the present invention will be explained below with reference to FIGS. 7 and 8.

Figure 4:
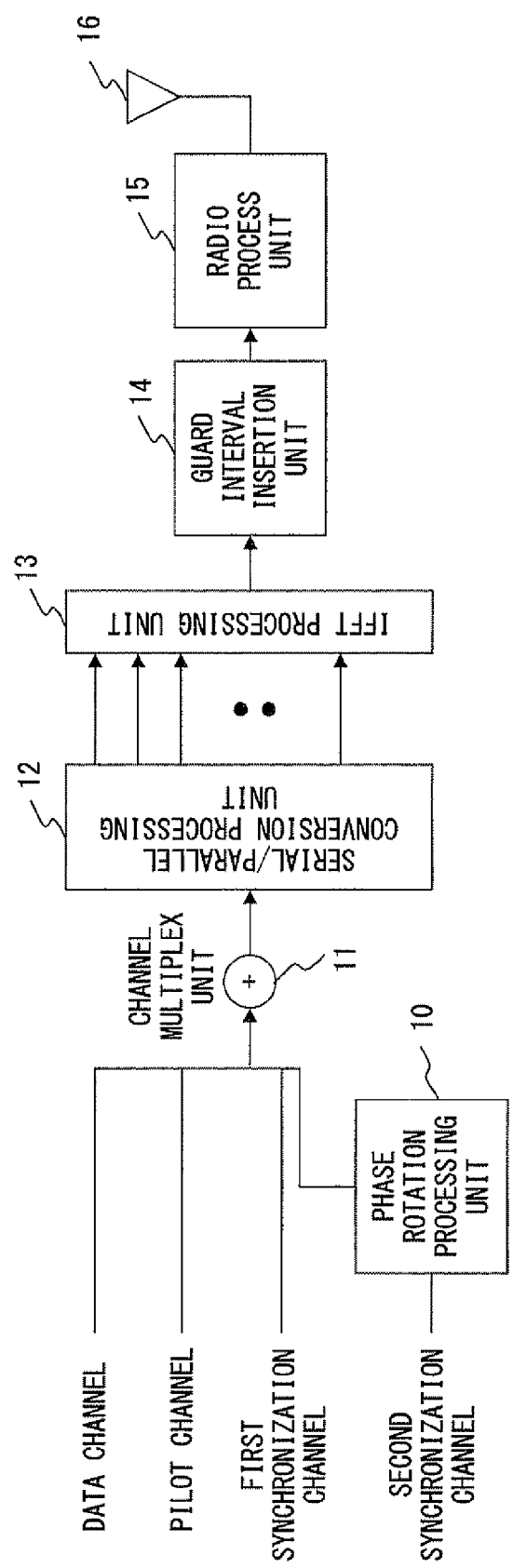
FIG. 4 explains the first preferred embodiment of the present invention (No. 1)
Figure 7:
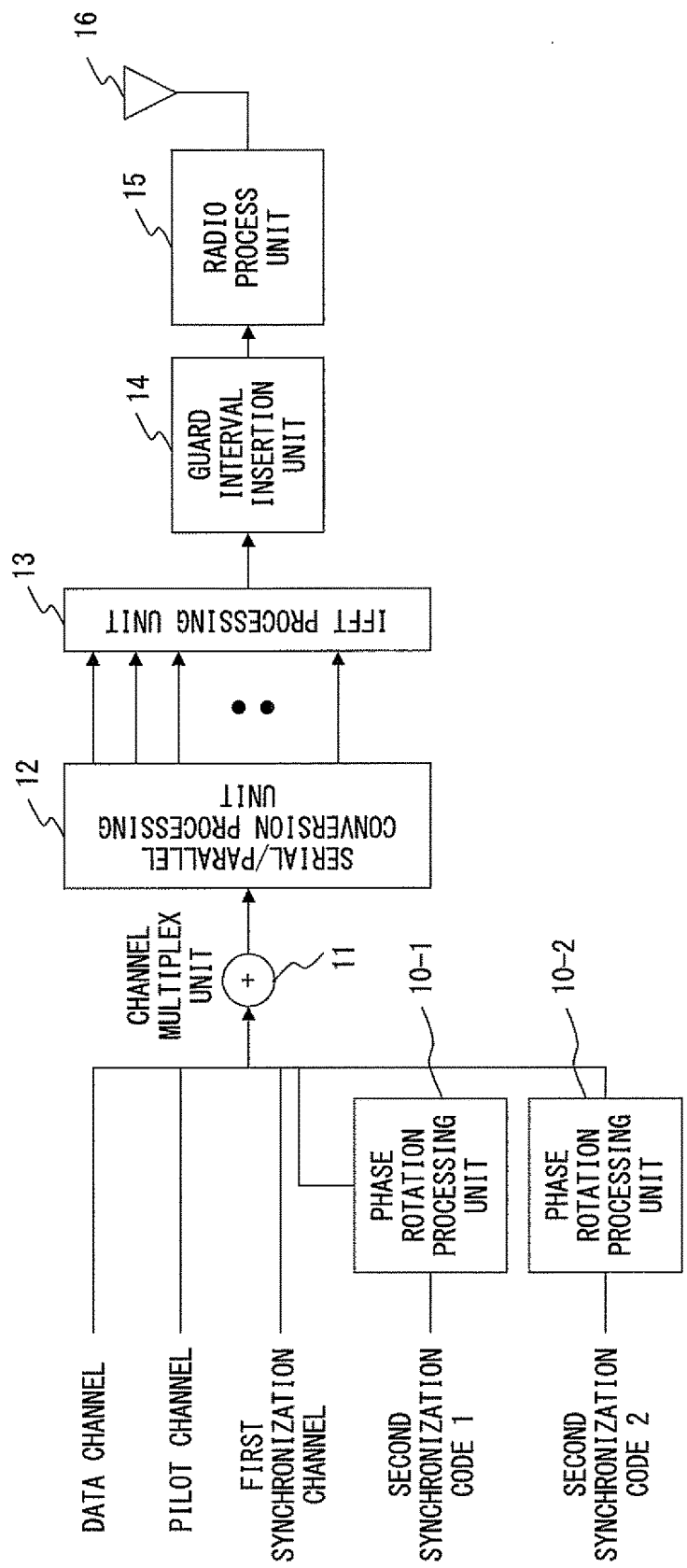
FIG. 7 explains the second preferred embodiment of the present invention (No. 1)
Figure 8:
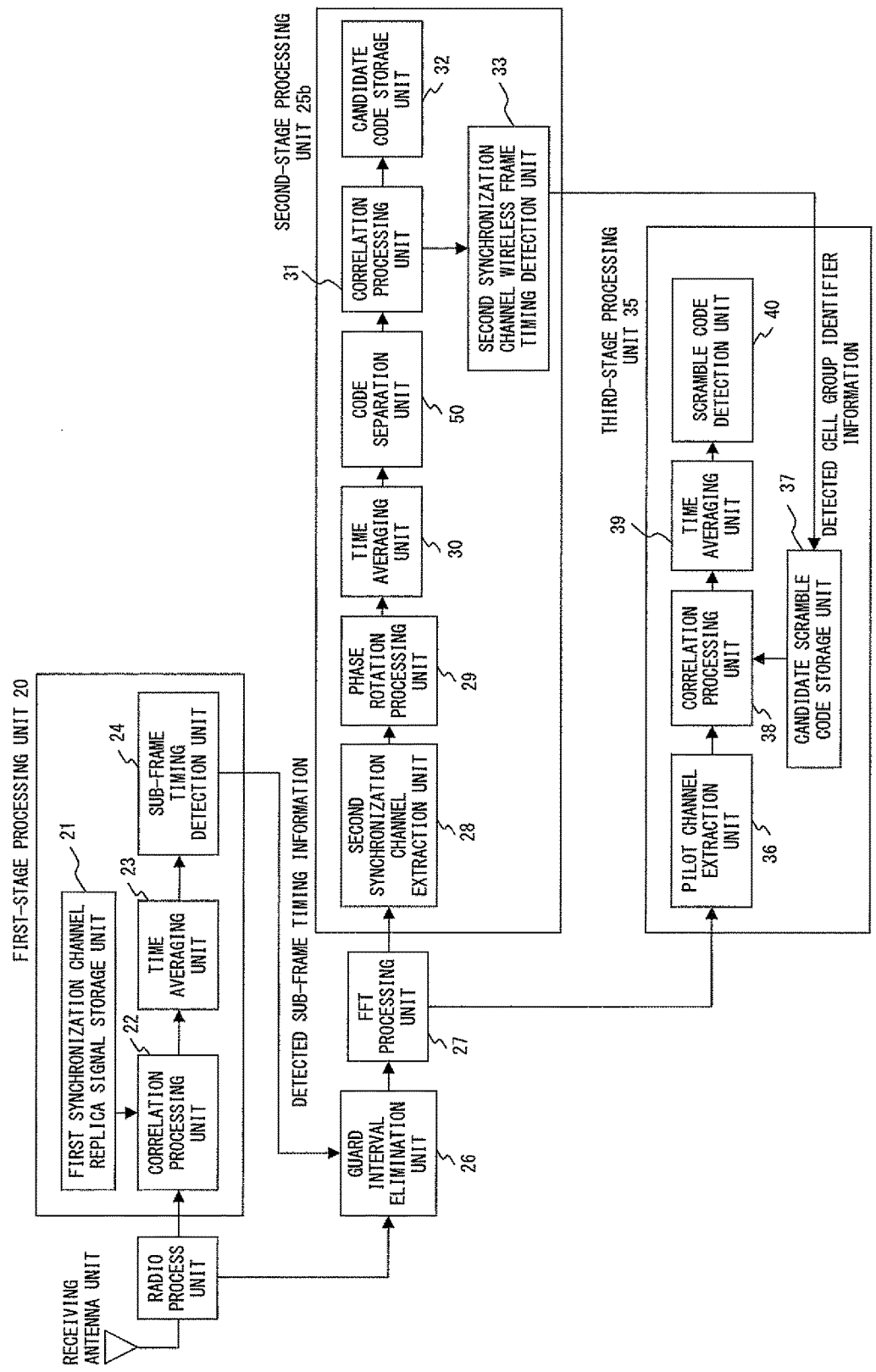
FIG. 8 explains the second preferred embodiment of the present invention (No. 2)

In FIGS. 7 and 8, the same reference numerals are attached to the same components as in FIGS. 4 and 6.

The second preferred embodiment is obtained by applying the first solution to a method for increasing the number of codes of the second synchronization channel explained with reference to Non-patent document 3.

FIG. 7 is an example configuration of the base station. The configuration is the same as that of the base station in the first preferred embodiment except for that the second synchronization channel includes two codes (the second synchronization codes 1 and 2). A phase rotation process is independently applied to the second synchronization codes 1 and 2. Specifically, each of the second synchronization codes 1 and 2 multiplexed on the i-th (i=0, 1, 2, . . . , $N_{sync}-1$) ($N_{sync}$ is the number of SCHs in a radio frame) SCH symbol can be expresses as follows.

[Mathematical expression 4]

$$\exp\left(j2\pi \frac{i}{N_{sync}}\right) W_{1,g}$$

$$\exp\left(j2\pi \frac{i+d}{N_{sync}}\right) W_{2,g}$$

In the above expression, d (–0, 1, . . . , $N_{sync}-1$) is the off-set of the phase rotation of the second synchronization code 2 against the phase rotation of the second synchronization code 1. By combining this off-set with the series numbers of the second synchronization code 1 and 2, the number of codes of the second synchronization channel becomes M×M×$N_{sync}$ and can be increased to $N_{sync}$ times as much as that of Non-patent document 3. However, M is the length of the second synchronization codes 1 and 2. In this way, a phase rotation processing units 10-1 and 10-2 perform the phase rotation of the second synchronization codes 1 and 2, respectively, and the channel multiplex unit 11 multiplexes them.

FIG. 8 is an example configuration of the cell search processing unit in a mobile station.

The first-stage processing unit 20 and the third-stage processing unit 35 are the same as those of the first preferred embodiment. The second-stage processing unit 25*a* includes a code separation unit 50 after the time averaging of the time averaging unit 30 and the process of a second synchronization channel radio frame timing detection unit differs from that of the first preferred embodiment. The code separation unit 50 separates the two second synchronization codes 1 and 2 multiplexed on the second synchronization channel. The correlation processing unit 31 performs the correlation operation between each received second synchronization code and a candidate Walsh code. The second synchronization channel radio frame timing detection unit 33 specifies the series number of each second synchronization code on the basis of the maximum correlation value, determines the amount of phase rotation of the correlation value of the second synchronization code 1, detects radio frame timing, detects the phase difference between the maximum correlation values of the second synchronization codes 1 and 2 and detects phase rotation off-set on the transmitting side.

The third preferred embodiment of the present invention will be explained below with reference to FIGS. 9 through 11.

Figure 9:
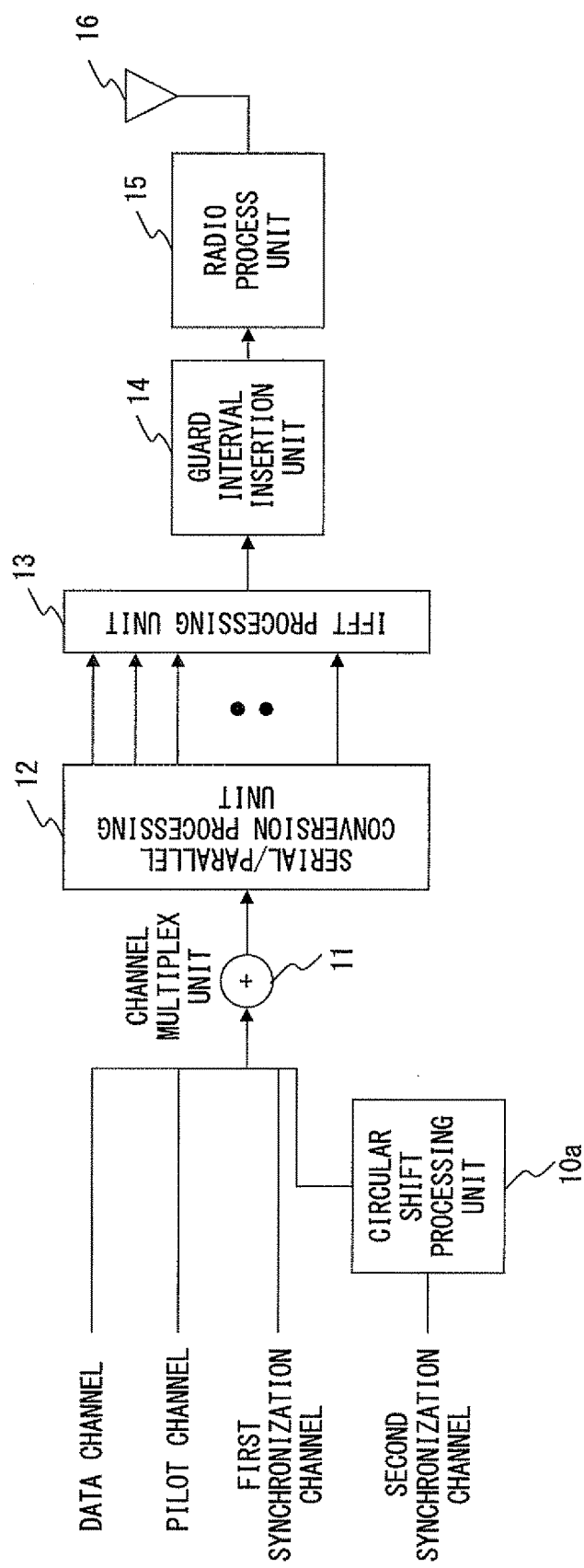
FIG. 9 explains the third preferred embodiment of the present invention (No. 1)
Figure 11:
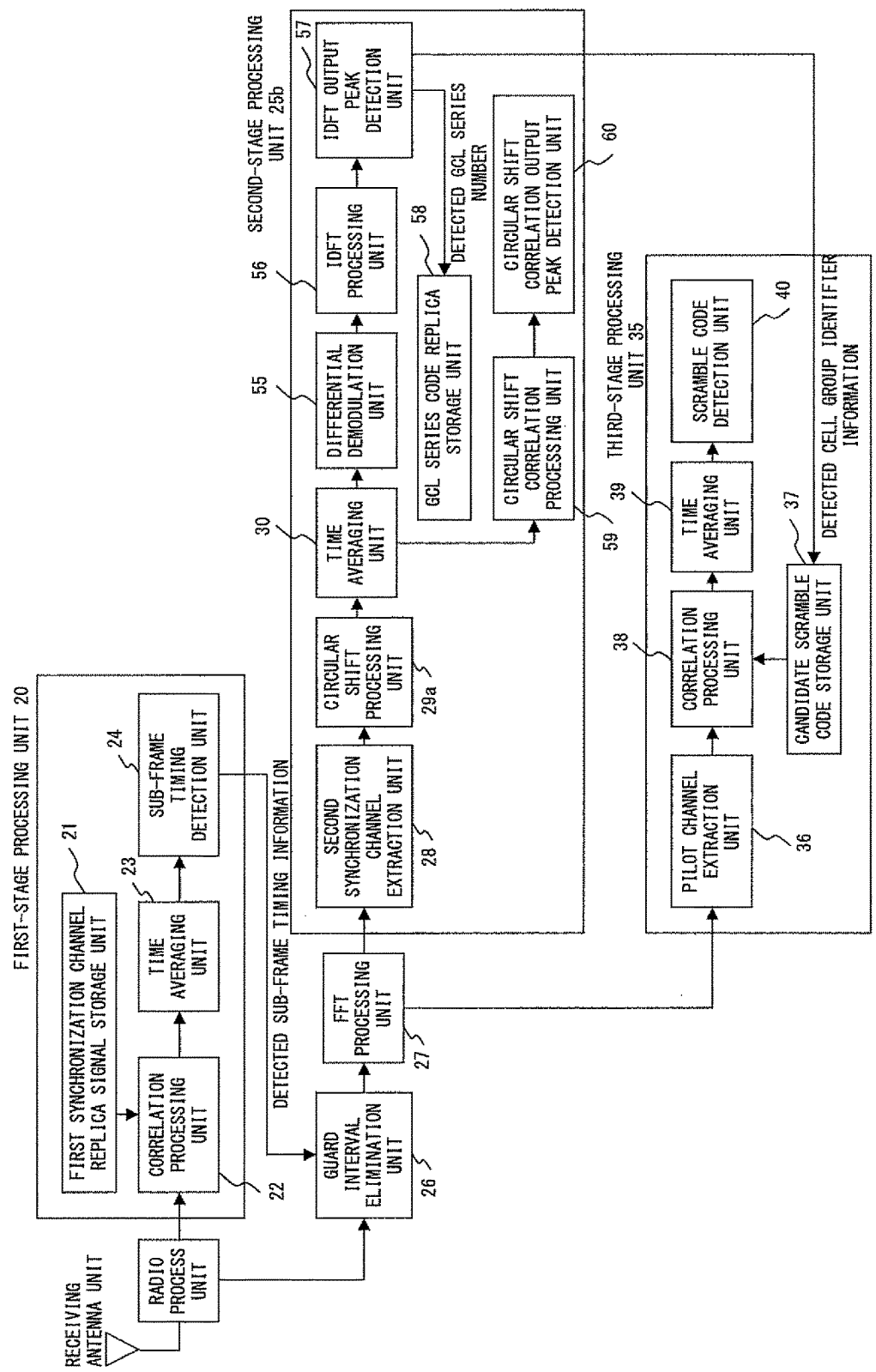

In FIGS. 9 and 11, the same reference numerals are attached to the same components as in FIGS. 4 and 6.

The third preferred embodiment is the preferred embodiment of the second solution.

FIG. 9 is an example configuration of the base station device. For the second synchronization code, a GCL series code indicating a cell group identifier (or a cell identifier) is used. Since the GCL code has been explained in the paragraph of BACKGROUND, please refer to the explanation. The second synchronization code is circularly shifted according to its position in the radio frame by the circular shift processing unit 10*a*. More specifically, the second synchronization channel multiplexed on the i-th (i=0, 1, 2, . . . , $N_{sync}-1$) ($N_{sync}$ is the number of SCHs in a radio frame) SCH symbol in the radio frame is circularly shifted by id. The circular shift is designed to finish in one cycle of one radio frame. Specifically, the following relationship is established.

[Mathematical Expression 5]

$$N_{sync}d = L_{S-SCH} \quad (3)$$

In the above expression, $L_{S-SCH}$ is the length of the second synchronization code.

However, although as illustrated in Expression 3, $L_{S-SCH}$ is expressed in the form of the product of integers, it is necessary for the length of the GCL series code to be a prime number. Therefore, $L_{S-SCH}$ and the length $L_{GCL}$ of a GCL series code used for the second synchronization code does not equal ($L_{GCL}$ is not a prime number according to Expression 3). Therefore, a method for shortening the GCL series code having the series length of the minimum prime number smaller than $L_{S-SCH}$ or a method for filling up a GCL series code having the maximum prime number smaller than $L_{S-SCH}$ with 0, a method for repeatedly using a part of a code or the like can be considered. Although the characteristic, such as an auto-correlation characteristic and the like, of a GCL series code is improved when its series length is a prime number, as described above, it has a characteristic sufficient to map it on an SCH and use it even when the series length is adjusted. Since the detection of the GCL series code, based on IDFT has no relation with the fact that the series length is a prime number, the use of a GCL series code (although it cannot be purely called a GCL series code since its series length is not a prime number) having length equal to $L_{S-SCH}$ can be also considered.

Furthermore, by attaching initial off-set δ (=0, 1, . . . , d–1) to the circular shift, the initial off-set can be combined with a GCL system number used for the second synchronization code and the number of codes usable as the second synchronization codes can be increased.

Figure 10:
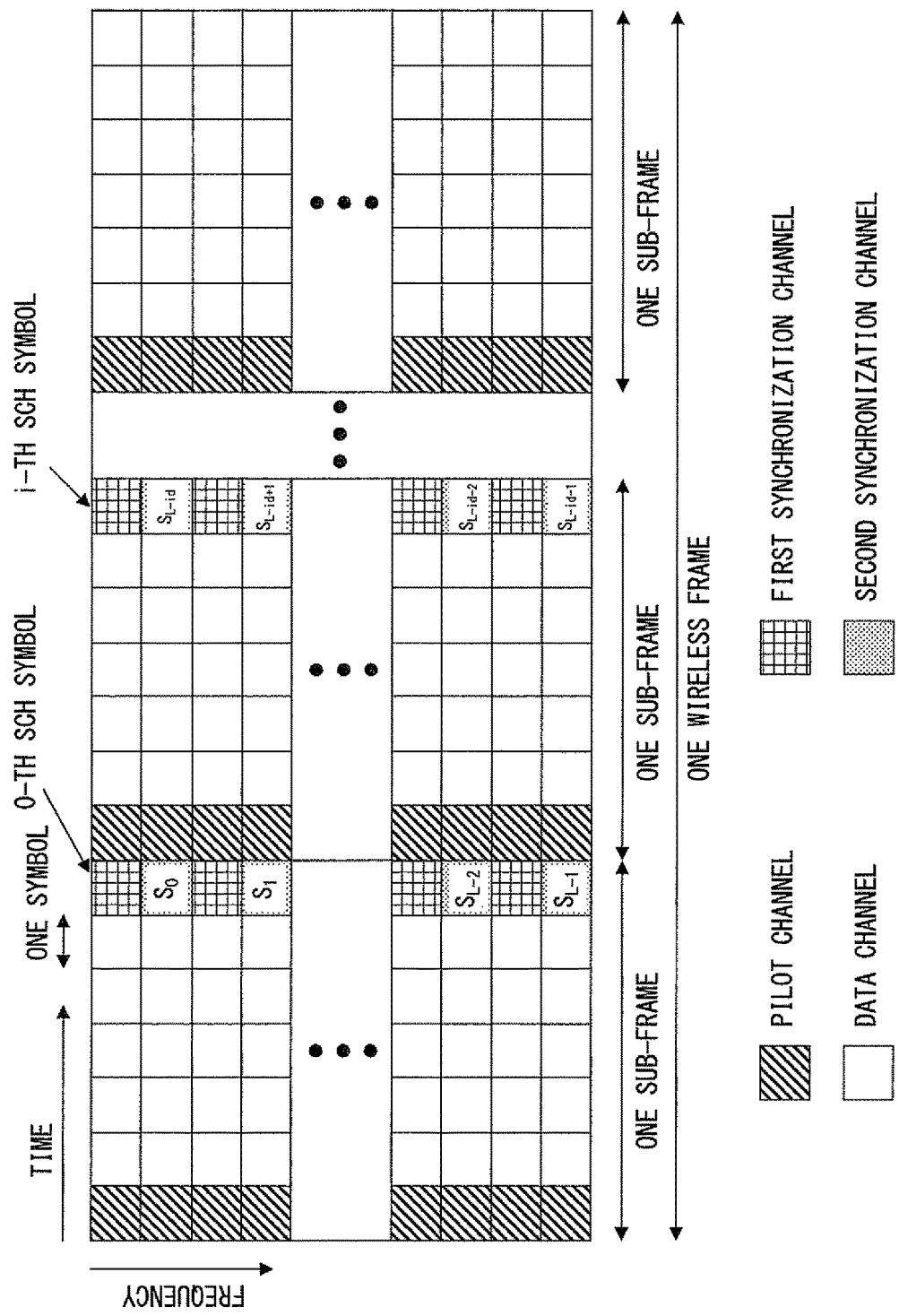
FIG. 10 explains the third preferred embodiment of the present invention (No. 2) and
FIG. 11 explains the third preferred embodiment of the present invention (No. 3).

FIG. 10 is an example of the radio frame structure.

In the example of FIG. 10, the pilot and synchronization channels are disposed at the head and tail symbols, respectively, of the sub-frame. The first and second synchronization channels are alternately frequency-multiplexed. FIG. 10 is only one example of the channel multiplex method and it is not restrictive of the present invention. As to the mapping method of the second synchronization channel too, many methods can be considered. For example, the second synchronization channel can be also mapped in an absolute phase assuming coherent detection using the first synchronization channel as the reference signal. Alternatively, it can also be mapped by differential encoding. At ant rate, the method is not restrictive of the present invention.

As illustrated in FIG. 10, although in the 0-th SCH symbol of the second synchronization channel, non-circularly shifted GCL series codes ($S_0, S_1, . . . , S_{L-2}$ and $S_{L-1}$) are used, in the i-th SCH symbol, ones obtained by circularly shifting the same GCL series codes by id ($S_{L-id}, S_{L-id+1}, . . . , S_{L-id-2}$ and $S_{L-id-1}$) are used.

FIG. 11 is an example configuration of the cell search processing unit in a mobile station.

The first-stage processing unit 20 and the third-stage processing unit 35 are the same as those of the first preferred embodiment. In the second-stage processing unit 25*b*, the guard interval elimination unit 26 eliminates a guard interval according to the FFT timing detected by the first-stage processing unit 20 and the FFT processing unit 27 converts the signal to a signal in the frequency domain by its FFT process. Then, the GCL system mapped on the second synchronization channel is extracted. In this case, since radio frame timing is unknown, the starting position of the received GCL system (on what order SCH in the radio frame the GCL series code is mapped) is unknown. However, the unit amount of circular shift of an SCH symbol is known. Therefore, in the circular shift processing unit 29a, circular shift the reversal of the unit circular shift applied on the transmitting side for each received SCH symbol is applied on the receiving side and the result is time-averaged. The differential demodulation unit 55 differentially demodulates the received GCL system. The differential demodulation performs a process expressed by the following expression.

[Mathematical Expression 6]

$$D(n) = R(n)R^*(n+1)$$

In the above expression, R(n) indicates the n-th symbol in the received GCL system. The IDFT processing unit 56 applies an IDFT process to the differential demodulation output. The result of the IDFT process becomes as follows.

$$\psi(k) = \sum_{n=0}^{n=L_{GCL}-1} D(n)\exp\left(j2\pi\frac{nk}{L_{GCL}}\right) \quad \text{[Mathematical expression 7]}$$

An IDFT output peak detection unit 57 specifies $k_{max}$ in which the output power $|\phi(k)|^2$ of the IDFT processing unit 56 is a maximum as a detected GCL system number. The principle of detecting this GCL system number is the same as explained in the prior art. A circular shift correlation processing unit 59 reads the GCL system replica s(n−d) of the detected GCL system number from a GCL system replica storage unit 60 and correlates circular shift $d=0\sim L_{GCL}-1$ with the received GCL system.

$$\Psi(d) = \sum_{n=0}^{n=L_{GCL}-1} R(n)s*(n-d) \quad \text{[Mathematical expression 8]}$$

The circular shift correlation output peak detection unit 60 detects and circularly shifts $d_{max}$ in which $|\psi(d)|^2$ becomes a maximum. Since $d_{max}$ indicates the amount of circular shift of the received GCL series code, it indicates on what order SCH in the radio frame the GCL series code is mapped. Since the time difference between the head of the radio frame and the SCH symbol is known in advance, by knowing $d_{max}$, radio frame timing can be known.

When radio frame timing is known, the position of the head of the radio frame is known. Therefore, data can be received.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitting device comprising:
   processor circuitry configured to map each of a plurality of codes on a respective one of a plurality of synchronization channels, the codes being given values of initial offsets of phase rotation, and being different from each other, each of the plurality of codes undergoing circular shifting in a frequency domain, the circular shifting occurring by a shift amount that depends on a position within a radio frame at which each of the plurality of codes is mapped on a respective one of the plurality of synchronization channels, wherein one frequency shift cycle is completed within one radio frame; and
   a transmitter that transmits a signal put in a radio frame in which the plurality of synchronization channels are multiplexed in a time direction.

2. The transmitting device according to claim 1, wherein each of the codes is circularly shifted by a given amount of a circular shift according to a position of each of the codes in the radio frame.

3. The transmitting device according to claim 1, wherein each of the codes is a different sequence generated by shifting a given code.

4. The transmitting device according to claim 1, wherein each of the codes is a combination of codes whose sequences are different.

5. The transmitting device according to claim 1, wherein each of the codes is a different sequence generated by a same processing circuit.

6. The transmitting device according to claim 1, wherein each of the codes is used to specify a cell or a cell group in a cellular system.

7. A communication system comprising:
   a receiving device; and
   a transmitting device that puts a signal in a radio frame in which a plurality of synchronization channels are multiplexed in a time direction and transmits to the receiving device, wherein
   the transmitting device includes,
   a transmitter configured to map each of a plurality of codes on a respective one of a plurality of synchronization channels, the codes being given values of initial offsets of phase rotation, and being different from each other, each of the plurality of codes undergoing circular shifting in a frequency domain, the circular shifting occurring by a shift amount that depends on a position within the radio frame at which each of the plurality of codes is mapped on a respective one of the plurality of synchronization channels, wherein one frequency shift cycle is completed within one radio frame and transmitting the codes.

* * * * *